May 17, 1932. R. W. CANFIELD 1,859,232
GLASS FORMING APPARATUS
Filed April 4, 1929 3 Sheets-Sheet 1
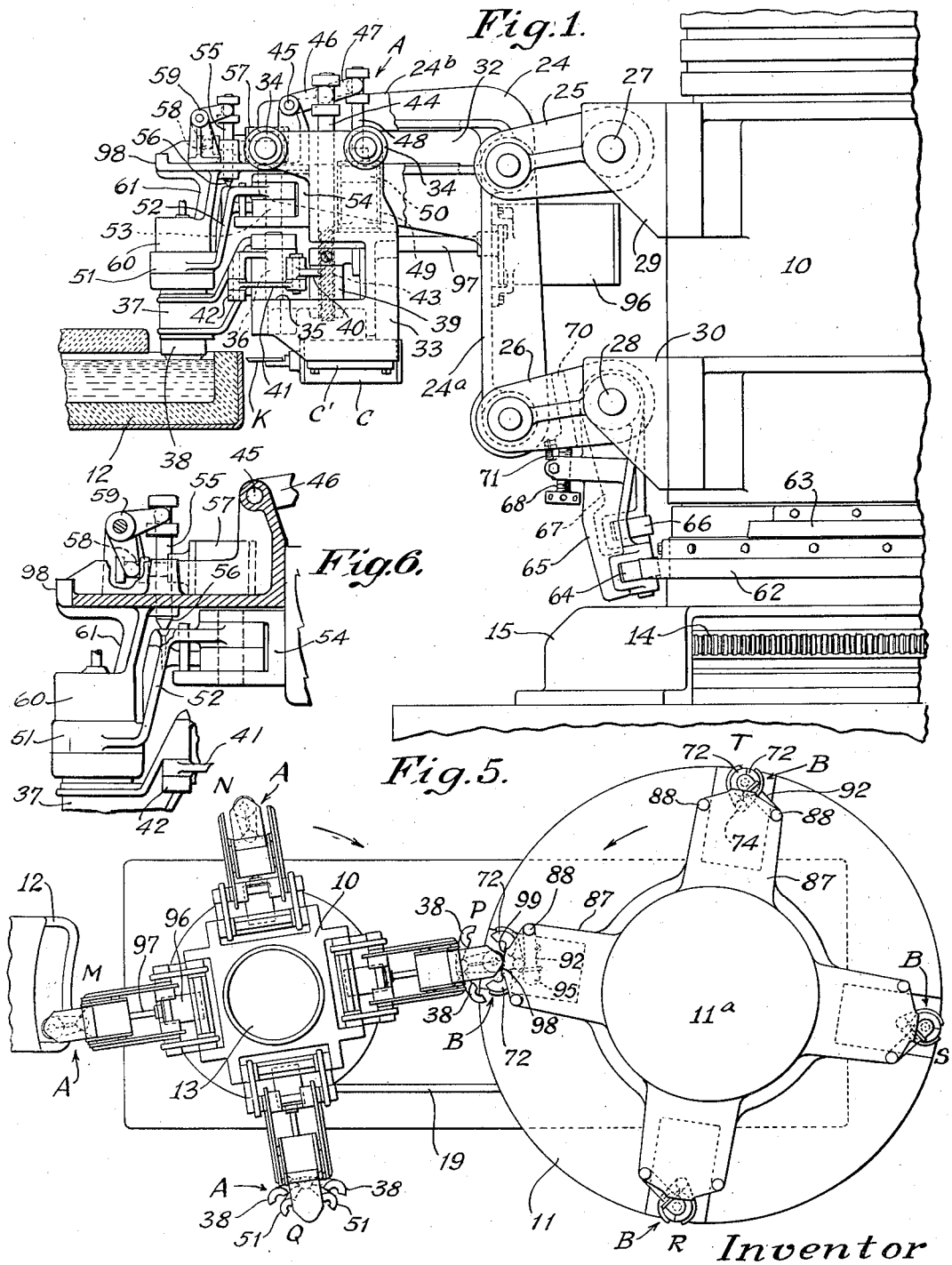
Inventor
Robert W. Canfield
by Brown+Parker
Attorneys

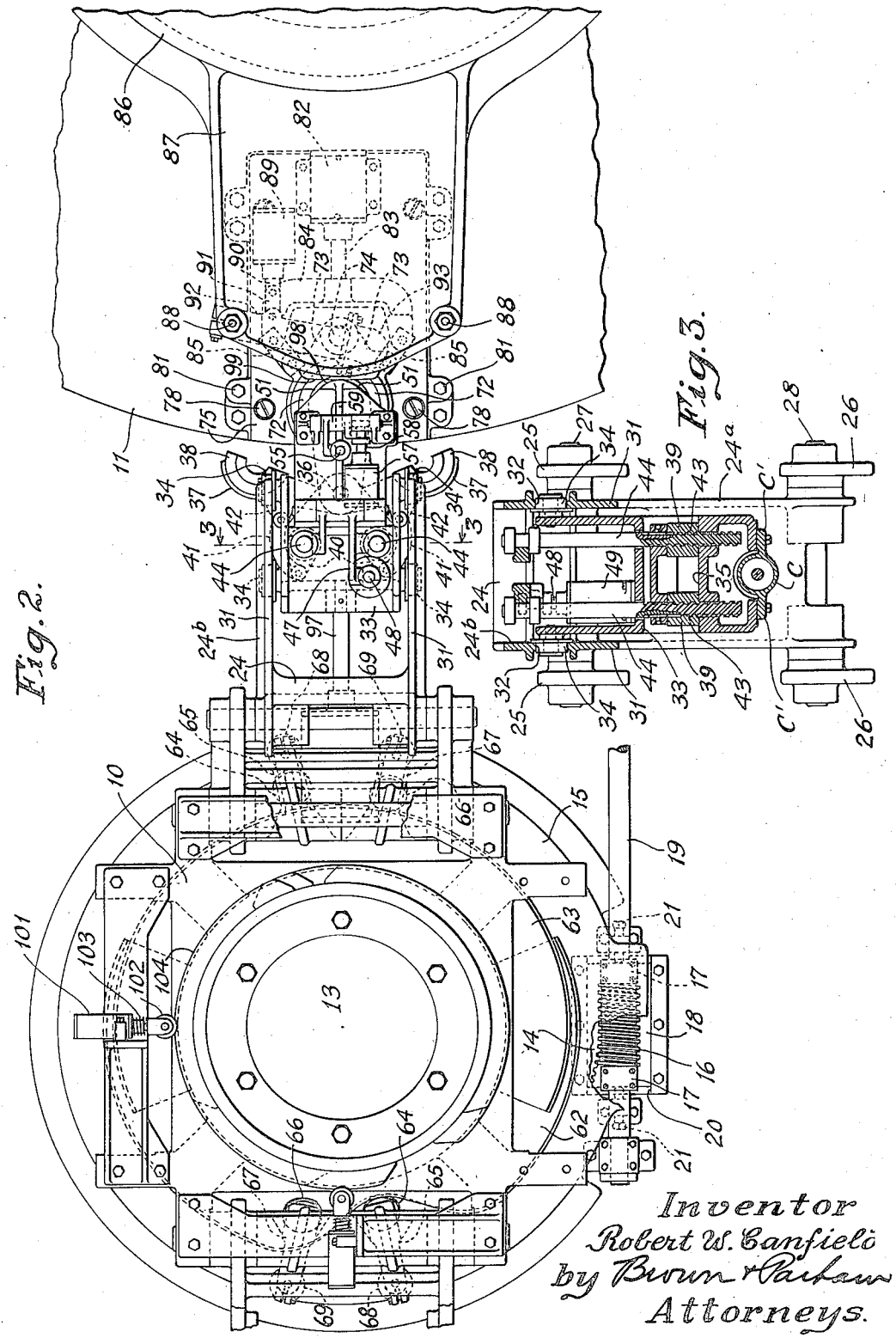

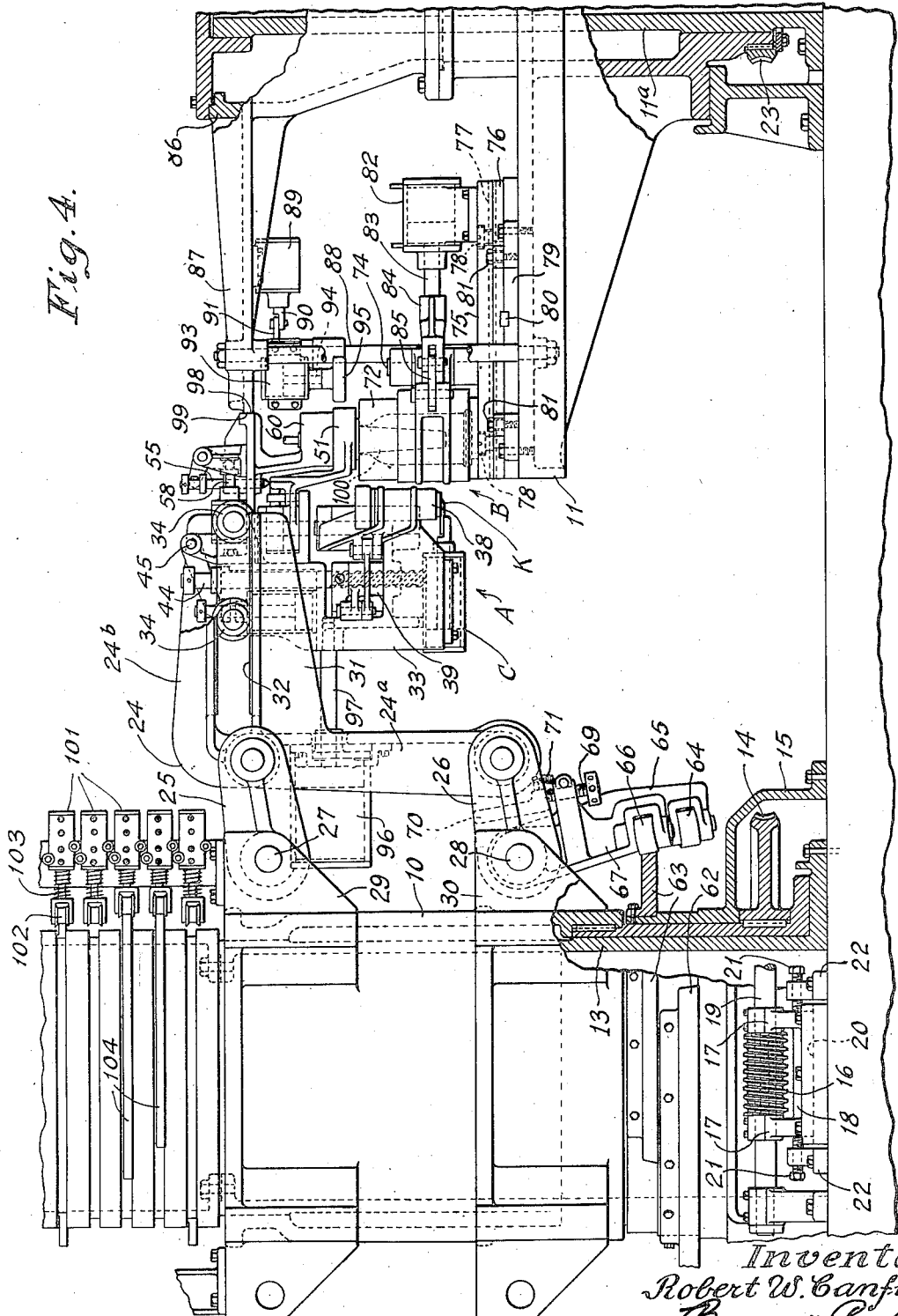

Patented May 17, 1932

1,859,232

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

GLASS FORMING APPARATUS

Application filed April 4, 1929. Serial No. 352,419.

My invention relates generally to the manufacture of hollow glassware and more particularly to glassware apparatus of the general type which comprises two adjacent rotary tables or carriers, one of which carries glass gathering and parison forming units which travel with the carrier and are moved vertically during the rotation of the carrier to and from the surface of a glass gathering pool, suction usually being employed to draw glass into each unit from the gathering pool and the gathered glass, after separation from the glass of the pool, being formed into a parison during a further part of the cycle of rotation, the second table of the apparatus carrying finishing molds to which the parisons are transferred and in which the fabrication of such parisons into articles of glassware is completed.

An object of the present invention is to provide an improved apparatus of the character above mentioned having capabilities of adjustment whereby the levels at which different operations in the formation of an article of glassware are performed in a cycle of the apparatus may be independently adjusted.

A more specific object of the invention is to provide in a glass forming apparatus of the character described novel mechanism for controlling the operations of each glass gathering and parison forming unit of the apparatus so that the position at which a glass gathering operation is to be performed and the position at which a parison formed of the gathered glass is to be transferred to a finishing mold may be independently adjusted vertically, whereby either the heighth of a parison mold included in the glass gathering and parison forming unit or the height of a finishing mold or the height of both of said molds may be varied within relatively wide ranges.

A further object of the invention is the provision in a glass forming apparatus of the character described of improved mechanism for securing coincidence of the parison supporting mechanism on one supporting rotating carrier, with the corresponding finishing mold on an associate rotating carrier for the portions of the cycles of rotation of the rotating carrier during which the transfer of the parison from its supporting mechanism to the finishing mold is effected.

A still further object of the invention is the provision in the two-table glass forming apparatus of the character described of a simple and readily operable mechanism for adjusting the phase relation between the two tables of the apparatus.

Further objects and advantages of the invention will be apparent from the following description, when it is considered in conjunction with the accompanying drawings, in which Figure 1 is a fragmentary view, mainly in elevation but partly in vertical section, showing one glass gathering and parison forming unit together with parts of the supporting and operating mechanism therefor and an adjacent gathering pool, the glass gathering unit being shown in position to gather glass from the pool;

Fig. 2 is a fragmentary plan view, showing the rotary table for supporting glass gathering and parison forming units, together with certain of the parts which are supported thereon or associated therewith and a fragmentary portion of the table for supporting the finishing molds, the view showing one glass gathering and parison forming unit and one finishing mold at a station for the transfer of a parison from the glass gathering and parison forming unit to the finishing mold;

Fig. 3 is a vertical section substantially along the line 3—3 of Fig. 2, looking in the direction of the arrows;

Fig. 4 is a side elevation of the structure shown in Fig. 2, with certain parts broken away and other parts shown in vertical section;

Fig. 5 is a diagrammatic plan view of the improved apparatus, illustrating the positions of the main parts on the two tables during various stages in the operation of forming an article of hollow glassware, and Fig. 6 is an enlarged view in vertical sectional elevation of the neck mold operating mechanism shown in Figs. 1, 2 and 4.

According to the present invention, two adjacent tables may be arranged to rotate synchronously in opposite directions about their respective axes. One of such tables may carry a plurality of glass gathering and parison forming units, each of which will be brought in its turn, as its supporting table rotates, first to a glass gathering position at a gathering pool and subsequently to a transfer station at which a glass parison formed of the gathered glass is to be transferred to a corresponding finishing mold on the second table. Each glass gathering and parison forming unit may include an open-bottomed removable and replaceable parison mold which preferably comprises separable body and neck portions, each made up of separable sections. The invention provides operating and controlling mechanism for each glass gathering and parison forming unit so that such unit will be lowered to the surface of the glass gathering pool at the proper time for the glass gathering operation and then raised from the glass pool and moved with the rotating carrier toward the parison transfer station. The level to which the lower end of the open-bottomed mold of the glass gathering and parison forming unit dips for the glass gathering operation may be adjusted independently of the level at which the parison transfer operation is to be performed.

In effecting the parison transferring operation, the parison body mold may be opened to leave the parison suspended from the neck mold as the unit approaches the transfer station. At the proper time, the halves of a divided finishing mold on the associate rotary finishing mold table are closed about the suspended parison during a period of coincidence of movement of the parison supporting means and the finishing mold. This coincidence of movement may be effected by mounting the glass gathering and parison forming unit on its supporting table for radial movements as well as for the vertical movements aforesaid and by providing cooperating guide means on the two tables for guiding the parison and the finishing mold into coincidence at the transfer station and for cooperating with yieldable means that acts to urge the guide means and the parison supporting means on the parison table radially outward as a unit to maintain such coincidence for the time required for the transfer operation.

The vertical movements of the glass gathering and parison forming unit during the portion of the cycle of the parison table that includes the transfer operation are controlled by means which can be adjusted to vary the heighth at which the transfer operation will be effected independently of the level at which the glass gathering operation takes place.

The two tables are driven by suitable mechanism so that the movements of the corresponding glass gathering and parison forming units and the finishing molds are synchronized and in order to assure proper synchronization of such movements at the beginning of operations or to restore such synchronization should it be lost, such driving mechanism can be adjusted to vary the phase relation of the two tables.

The independent adjustment of the vertical movements of the glass gathering and parison forming unit for a glass gathering operation and for the transfer of a parison to the finishing mold permits the gathering of glass at different levels without any changes in the construction and operation of the finishing mold table and associate parts, the use of parison molds of different lengths without replacement or change of the finishing molds, or the use of finishing molds of different heights without change of the parison molds.

Referring now more particularly to the drawings, two adjacent rotary tables or carriers are indicated at 10 and 11, respectively, in Figs. 2, 4 and 5. The rotary carrier 10 is located between the table 11 and a pool of molten glass in a gathering pot or other container 12. The carrier 10 carries a plurality of spaced glass gathering and parison forming units, generally indicated at A, while the carrier 11 carries cooperating finishing mold units generally indicated at B.

The carrier 10 may be mounted to rotate about the axis of a vertical post or column 13 and is shown to advantage in Fig. 4 as having a hub portion provided with a worm gear 14. The worm gear 14 may be located within a housing 15 which may be partially broken away at one side, as indicated in Fig. 2, to accommodate a worm 16 which is in mesh with and drives the worm gear 14. The worm 16 is rotatably supported at its ends between upstanding members 17 on a slide block 18 but is splined to a shaft 19 so as to rotate with the latter. The slide block 18 is slidable longitudinally in the guideway 20, Fig. 4, while the worm remains in mesh with the worm gear so that the position of the slide block 18 along the slideway 20 may be adjusted within limits by the adjusting and positioning screws 21 which are threaded through stationary lugs 22 on the base of the apparatus. Thus, longitudinal movement of the worm 16 may be effected to adjust the rotary carrier 10 angularly about the axis of its supporting column 13 for a purpose to be presently stated. The finishing mold table 11 is shown in Fig. 4 as having a hub portion provided with a worm gear 23 and as being mounted for rotation about the vertical column 11a. This worm gear 23 is adapted to be engaged by a worm, not shown, similar to the worm 16 and adapted to be connected in any suitable known manner with the shaft 19 so that the worm gears 14 and 23 and consequently the rotary carriers 10 and 11 will be rotated in synchronism with each other. At the same time, it is possible to adjust the phase relation between the tables 10 and 11 and between the cycles of operation of corresponding glass gathering and parison forming units and finishing molds on the respective tables by adjusting the worm 16 longitudinally in the manner above described so as to adjust the carrier 10 angularly about its axis of rotation while the carrier 10 is rotating and while the effect of progressive adjustment of the worm can be noted. This permits accurate predetermination of the relative positions of corresponding units on the two tables at any given point in the cycle of operations of the complete apparatus, as at the time the transfer of a parison from the parison forming unit to the finishing mold unit is to be effected.

One of the glass gathering and parison forming units A is illustrated in detail in Figs. 1 to 4 inclusive and a description thereof will suffice for a description of each of the remaining glass gathering and parison forming units. Consequently, illustration of such remaining glass gathering and parison forming units has been omitted from Figs. 1 to 4 inclusive.

The glass gathering and parison forming unit shown in Figs. 1 to 4 inclusive may comprise a vertically swingable supporting member 24 which is shown as being of substantially inverted L-shape and as having a substantially vertical arm 24a pivotally connected adjacent to its upper end to the outer ends of a pair of horizontally spaced parallel links 25 and pivotally connected adjacent to its lower end to a pair of horizontally spaced parallel links 26. The pairs of links 25 and 26 are parallel and have their inner end portions pivotally connected to transverse horizontal shafts 27 and 28, respectively, such shafts being carried by pairs of vertically spaced outstanding ears or lugs 29 and 30, respectively, on the rotary carrier 10. The vertically swingable supporting member 24 also includes an outwardly extending supporting arm 24b which comprises a pair of side members 31, Fig. 3, having longitudinal slots 32 formed therein. A radially movable frame or carriage 33 has its upper portion disposed between the side members 31 and is provided at its opposite sides with wheels 34 which run in the slots 32, whereby the carriage 33 will be suspended from the supporting arm 24b and will be guided for movements longitudinally of the supporting member 24b which will be radially of the rotary parison table.

The carriage 33 has a cut away portion at 35, Fig. 1, for the reception of operating mechanism to be presently described. A pivot pin 36 is upstanding from the bottom of the cutaway portion 35 of the carriage 33.

The arms 37 of holders for the half sections 38 of a divided parison body mold are pivoted on the pin 36. The cutaway portion 35 of the carriage also accommodates rock collars 39 which are provided with rocker arms 40, Figs. 1 and 2, operatively connected by pivoted links 41 with suitable attaching ears 42 on the arms of the holders for the sections of the parison body molds. The rock sleeves 39 have their bores provided with spiral screw threads in mesh as at 43, Figs. 1 and 3, with spiral threads on vertically reciprocable pins 44. The spiral screw threads on the two pins 44 are respectively right and left-hand threads, as clearly shown in Fig. 3, and the pins 44 are arranged to be reciprocated in unison so that the halves of the parison body mold will be swung open as shown in Fig. 2 when the pins 44 are in their downwardly projected positions, as shown in Fig. 3, and the halves of the parison body mold will be closed when the pins 44 are in their upwardly projected positions as shown in Fig. 1. The simultaneous controlled reciprocations of the pins 44 may be effected by mechanism comprising a rock shaft 45 supported on the upper part of the carriage 33 and provided with rocker arms 46 and 47, respectively engaged with the upper end portions of the respective pins 44 so that swinging movements of these rocker arms about the axis of the shaft 45 will raise and lower the pins 44 in unison. The rocker arm 47 is shown in Fig. 1 as having an end portion engaged with the upper end portion of a vertically reciprocable piston pin 48 which protrudes from the upper end of a fluid pressure cylinder 49 that is mounted on a portion of the carriage 33. When the piston 50 in the cylinder 49 is reciprocated, the pins 44 will be reciprocated vertically and the halves of the parison body mold will be opened or closed according to whether the pins 44 are moved downward or upward.

The halves 51 of a parison neck mold are shown in the drawings as carried by holders having arms 52 pivotally mounted on a vertical pivot pin 53, Fig. 1, which may be supported on a bracket 54 attached to or integral with a portion of the carriage 33. The halves of the parison neck mold may be opened and closed in any suitable manner. In the drawings, Fig. 1, I show a vertically reciprocable pin 55 having a tapering lower end portion 56 adapted to be forced downward between portions of the arms 52 of the respective holders for the half sections of the neck mold when the pin 55 is moved downward from the position shown in Fig. 1. Opening of the halves of the parison neck mold thus will be effected. The reciprocations of the pin 55 may be controlled by the operations of a piston in a horizontal cylinder 57 on the upper part of the carriage 33, such piston having a rod 58 connected with one arm of a bell crank lever 59, the other arm of which is engaged with the upper end of the pin 55. Thus, the horizontal reciprocations of the piston in the cylinder 57 will cause vertical reciprocations of the pin 55 and downward movement of the latter from the position shown in Fig. 1 and will effect opening of the halves of the parison neck mold. Upon movement of the pin 55 after the halves of the parison neck mold have been opened will permit closing of the halves of the neck mold and such closing may be effected by contact of the halves of the parison body mold therewith as the parison body mold is closed or spring means, not shown, may be provided between the supporting arms for the halves of the parison neck mold so as to close the latter when the position of the pin 55 will permit.

A head 60 is supported, as by being connected with the carriage 33 by an arm 61, so that a substantially fluid tight contact will be established between the head 60 and the closed halves of the parison neck mold. The head 60, the parison neck mold and the parison body mold all are disposed in vertical alignment, as shown. The head 60 may be a combined suction and blow head or only a suction head. Suitable connections may be provided in any suitable known manner for connecting such head with a source of application and exhaust of subatmospheric pressure and if the head is to serve also at times as a blow head, suitable connections therewith will be provided for admitting superatmospheric pressure fluid thereto and for controlling the exhaust of such pressure therefrom at the proper times.

The glass gathering and parison forming unit just described will be carried by the rotary table or carrier 10 about the axis of rotation of the latter. The level to which the lower end of the parison body mold will be dipped for the gathering of a charge of molten glass from the gathering pool and the level of the lower end of the parison forming unit, and consequently of the parison formed therein, at the time of the transfer of such parison to a finishing mold are independently regulable. To this end, the vertical movements of the glass gathering and parison forming unit during the portion of the cycle of rotation of the carrier 10 which includes the gathering operation are controlled by a cam 62 which may be secured to an upward extension of the housing 15 at the lower end of the column 13 while the vertical position of the lower end of the parison forming unit during the portion of the cycle of rotation of the carrier 10 that includes the transfer operation is under the control of a separate cam 63 which likewise may be secured to the aforesaid upward extension of the housing 15 or to any stationary structure surrounding the axis of rotation of the carrier 10.

Each of the cams 62 and 63 preferably extends through slightly more than 180° circumferentially of the column 13 and the cams 62 and 63 may be relatively arranged so that the end portions thereof overlap, as clearly shown in Fig. 2. A cam roll 64 is carried by a lever 65 in position to traverse the cam 62 during part of the cycle of rotation of the carrier 10 while a similar cam roll 66 is carried by a lever 67 in position to traverse the cam 63 during the remaining part of the cycle of rotation of the carrier 10. The cam roll supporting levers 65 and 67 are pivotally supported on the transverse pivot element 28 on which the links 26 also are pivotally supported. Adjustable motion transmitting screws 68 and 69, respectively, are threaded through lugs on the levers 65 and 67, respectively, and bear against a cross web 70 which connects the respective links 26. Springs, as at 71 connect the levers 65 and 67 with the links 70 and tend to hold the upper ends of the adjusting screws 68 and 69 against the web 70. These springs prevent each of the levers 65 and 67 from flapping idly when the roll on the other lever is in contact with its associate cam. Since the screws 68 and 69 are independently adjustable, the level to which the lower end of the parison body mold will dip for the gathering of glass from the gathering pool can be adjusted without changing the level of the lower end of the parison at the parison transfer station. Thus, the glass gathering and parison forming unit may be used to gather glass at different levels without any change in the construction of the glass gathering and parison forming mechanism or of the construction of the associate finishing mold and its operating mechanism being required. Likewise, finishing molds of different heights or parison molds of different heights may be employed at different times without necessitating any change of level of the gathering pool or replacement of parts of the improved apparatus. The improved apparatus thus has a relatively wide range of utility and may be used in the manufacture of glassware of different sizes and under different service conditions. The provision of the hereinbefore described supporting mechanism, including the parallel links 25 and 26, permits vertical movements of the glass gathering and parison forming unit while the parts of such unit are maintained vertical.

Referring now to the structure on the finishing mold table, Figs. 2, 4 and 5, it will be noted that each finishing mold may comprise a pair of half sections 72 mounted in holders having arms 73 pivoted on a vertical pivot element 74 which is upstanding from a plate 75. The plate 75 is mounted for adjustment both radially of the table 11 and in the direction at right angles to the direction of the radial adjustment. Thus, the plate 75 is slidably disposed on the plate 76 and is capable of guided radial movement on the plate 76, a radial key 77 being provided in aligned keyway grooves between the two plates 75 and 76 to permit such guided movement of the plate 75. Screws 78 extend through radially enlarged openings or slots in the plate 75 into the plate 76 and are adapted to secure the plate 75 in radially adjusted position on the plate 76. The plate 76 with the plate 75 thereon is superimposed on a plate 79 that is secured fixedly on the table 11. A key 80, disposed substantially at right angles to the key 77, is provided in aligned keyway grooves between the plates 76 and 79 and permits lateral adjustment of the plate 76 and the parts carried thereby on the plate 79. Screws 81 extend through laterally enlarged openings or slots in the plate 76 into the plate 79 and are adapted, when tightened, to secure the plate 76 in laterally adjusted position on the plate 79 and consequently on the table 11.

The halves of the finishing mold may be opened and closed in any suitable manner. In the drawings, Figs. 2 and 4, I show a pressure cylinder 82 mounted on the plate 75. A piston rod 83 protrudes from the outer end of the cylinder 82 and carries a cross yoke or head 84 having arms connected by links 85 with ears on the respective arms of the holders for the halves of the finishing mold. Thus, when the piston in the cylinder 82 is in its outwardly projected position, as shown in Fig. 4, the halves of the finishing mold will be closed and retraction of the piston in the cylinder 82, from the position shown in Fig. 4, will cause opening of the halves of the finishing mold.

A spider 86 is secured to the hub of the table 11 for rotation with the latter about the axis of the column 11a and has a radially extending arm 87 located above each finishing mold unit and secured to the finishing mold table, as by the vertical posts 88. The arm 87 carries a pneumatic cylinder 89. A piston rod 90 protruding from the outer end of the pneumatic cylinder 89 is connected by a link 91 with a horizontally swingable arm 92 which may be pivoted at one end on one of the posts 88. The arm 92 carries a vertical pneumatic cylinder 93. A piston rod 94 protrudes from the lower end of the cylinder 93 and carries a final blow head 95. Thus, movement of the piston in the cylinder 89 will cause swinging of the arm 92 so as to position the vertical cylinder 93 over the finishing mold or at a position inward of the finishing mold and above the level of the latter, as desired. When the cylinder 93 is above the finishing mold, downward movement of the piston in the latter will move the final blow head 95 downward to position to cooperate with the finishing mold.

The operation of the parts of the apparatus which have been described so far may be substantially as follows:

The rotation of the carrier 10 in the direction indicated by the arrow in Fig. 5 will cause each of the glass gathering and parison forming units A to be brought in its turn above the gathering pool in the container 12 and the coaction of the cam roll 64 with the cam 62 will permit the glass gathering and parison forming unit to be lowered a distance that is regulably predeterminable by adjustment of the screw 68 to position to contact with the glass of the pool, as at the position indicated at M in Fig. 5. The parison body and parison neck molds will both be closed at this time and suction may be applied through the head 60 to draw glass from the pool into the glass gathering and parison forming unit. The continued rotation of the table 10 will be accompanied by a raising of the charged glass gathering and parison forming unit and a suitable cut-off knife K, Fig. 1, may be projected outward from the position shown to wipe across the bottom of the parison body mold to sever any strings or tail of glass between the gathered glass and the glass in the pool so that such severed glass will fall back into the pool. The cut-off knife is shown as being supported on the outer end of a piston rod which protrudes from the outer end of a horizontal pressure fluid cylinder C that is secured to the lower part of the carriage 33 by attaching ears C' and suitable screws or other fastening devices, Fig. 3. The vertical position of the cylinder C with respect to the carriage 33 may be adjusted by the use of shims of different thickness between the attaching ears and the carriage 33 to assure proper cooperation between the cut-off blade and parison molds of different lengths, or any other suitable vertically adjustable severing mechanism may be employed. A bottom plate, not shown, also may be employed in a manner well known in the art to close the lower end of the parison body mold after the gathering operation so that the glass therein may be partially expanded by the application of superatmospheric pressure through the head 60 or such superatmospheric pressure may be applied while the cut-off knife remains in closing relation to the lower end of the parison body mold.

The rotation of the carrier 10 will bring the charged glass gathering and parison forming unit toward the position N in Fig. 5. It will be noted that the glass gathering and parison forming unit may have been projected radially outward for the gathering operation, such outward projection being effected by movement of a piston in a cylinder 96 that is secured to the arm 24a of the supporting member 24 and has a piston rod 97 protruding from its outer end and connected with the carriage 33. Thus, movement of the piston in the cylinder 96 to the outer end of the latter will move the carriage 33 and the parts which are carried thereby radially outward to the projected position indicated for the position M in Fig. 5. However, when the glass gathering and parison forming unit moves away from the gathering pool the cylinder 96 may be retracted radially inward to the position indicated at N in Fig. 5. The unit may remain in its inwardly retracted position as it is moved from the position N in Fig. 5 for part of the distance to the position P in Fig. 5. The piston in the cylinder 96 then is actuated to move the carriage 33 radially outward to cause a cam follower 98, which may be a rounded outer end portion of the upper part of the carriage 33, to contact with and follow a positioning cam or guide 99 on the finishing mold table, such guide being shown as comprising the outer end portion of the spider arm 87. The working surface of the positioning cam or guide 99 is laid out so as to cause the parison 100 that depends from the closed neck mold at the position P of Fig. 5 to move in coincidence with the finishing mold on the table 11 during such portions of the movements of the two tables respectively in the directions of the arrows in Fig. 5 as are required for the halves of the finishing mold to be closed about the suspended parison and for the neck mold to be opened to release the parison after the closing of the finishing mold. Thus, the working surface of the guide 99 may be laid out along an arc parallel with a portion of the path of movement of the finishing mold about the axis of rotation of the table 11. The cam or guide follower 98 is held resiliently against the cam or guide 99 by the pressure fluid in the cylinder 96 and thus the transfer of the parison to the finishing mold may be effected without any lateral distortion of or lateral stress on the suspended parison, thus making for the production of a superior article of glassware. As the rotation of the carrier 10 continues, after the transfer has been effected in the manner just described, the glass gathering and parison forming unit may move past the position indicated at Q in Fig. 5, the parison body mold and the parison neck mold being open for cooling and the unit being in its radially projected position, if desired. As a cycle of rotation of the carrier 10 is completed, the unit is again moved to the position M with the parts of each of the parison body mold and parison neck mold closed so that another gathering operation may be effected.

The closed finishing mold with the parison therein will be moved by the rotation of the table 11 from the transfer station toward the position indicated at R in Fig. 5. During this part of the cycle of rotation of the table 11, the pistons in the cylinders 89 and 93 of the final blow head supporting and operating structure will be actuated at the proper times and in a suitable manner to effect the swinging of the blow head 95 to a position over the closed finishing mold and the lowering of such blow head to cooperative relation to the finishing mold so that blowing pressure may be applied to the glass in the finishing mold. The blowing of the parison may continue through the positions respectively indicated at S and T in Fig. 5 and shortly after the finishing mold passes the position indicated at T, the halves thereof may be opened to permit the finished article to be taken out, the final blow head being moved from its active position upwardly and inwardly to the position shown in Fig. 4.

Adjustment of the worm 18 longitudinally of the shaft 19 to adjust the carrier 10 angularly about the axis of rotation of the column 13 may be made at the beginning of operations if required to assure proper coordination of the corresponding glass gathering and parison forming units and finishing mold units of the two tables or such adjustment may be effected at a later time to restore proper coordination of movements of the units on the two associated tables should such coordination be disturbed or impaired in any way.

The application of and exhaust of fluid pressure to and from the pneumatic operating and pressure applying mechanisms of the apparatus may be controlled in any suitable known manner, as by means of properly timed valves, such as are indicated at 101, Fig. 4, as being positioned on the carrier 10 adjacent to the column about which the carrier 10 rotates. Such valves are shown as having stems provided with rollers 102 which are urged by the springs 103 against suitable stationary cams 104 on the column 13 so that the valves 101 will be actuated at the proper times in the cycle of rotation of the table 10. It, of course, will be understood that such valves may be connected in any suitable known manner, as is well known in the art with the respective mechanisms which they are intended to control.

While I have shown and described one practical embodiment of the invention, it is to be understood that the features of the invention may be modified as to combination and arrangement to adapt the invention to different conditions of service and for different use without departing from the spirit and scope of the invention as set forth in the appended claims. The invention has been illustrated and described as embodying apparatus including two adjacent tables designed to be rotated continuously about different vertical axes but it will be understood that the principles of the invention are applicable to a construction having tables rotated intermittently or in a construction

I claim:

1. In glass forming apparatus having horizontally spaced glass gathering and parison transfer stations, the combination of a glass gathering and parison forming unit mounted to travel along a path having different portions extending past said stations, and means for regulably predetermining the level of said unit at said transfer station independently of the level thereof at the glass gathering station.

2. In a glass forming apparatus, a carrier mounted to rotate about a vertical axis, a glass gathering and parison forming unit connected with said carrier for movement with the latter about said vertical axis in a path extending past spaced glass gathering and parison transfer stations, respectively, and for independent vertical movements, separate means controlling the vertical movements of said glass gathering and parison forming unit, and means for effecting independent adjustment vertically of the glass gathering and parison transfer positions of said unit.

3. In a glass forming apparatus, a carrier mounted to rotate about a vertical axis, a vertically movable supporting frame connected with said carrier for rotation with the latter about said vertical axis, cam actuated means for controlling the vertical movements of said supporting frame during part of the cycle of rotation of said carrier, other cam actuated means for independently controlling the vertical movements of said supporting frame during the remaining part of the cycle of rotation of the carrier, and glass gathering and parison forming mechanism carried by said vertically movable supporting frame.

4. In a glass forming apparatus, a carrier mounted to rotate about a vertical axis, a vertically movable supporting frame connected with said carrier for rotation with the latter about said vertical axis, cam actuated means for controlling the vertical movements of said supporting frame during part of the cycle of rotation of said carrier, other cam actuated means for independently controlling the vertical movements of said supporting frame during the remaining part of the cycle of rotation of the carrier, glass gathering and parison forming mechanism mounted on said vertically movable supporting frame for travel with the latter and for independent radial movements, and means for controlling the radial movements of said glass gathering and parison forming mechanism on said supporting frame.

5. In a glass forming apparatus, a carrier mounted for rotation about a vertical axis, a vertically movable supporting frame, a vertically spaced pair of links pivotally connecting said frame with said carrier, glass gathering and parison forming mechanism carried by said movably mounted frame for movement past a gathering station at a pool of molten glass and a parison transfer station as said carrier rotates, a stationary cam, adjustable motion transmitting mechanism carried by said carrier cooperating with said cam and with said vertically movable frame to cause said glass gathering and parison forming mechanism to dip to the surface of the gathering pool at said gathering station and to be raised from said gathering pool after a glass gathering operation, a second stationary cam, and adjustable means cooperating with said second-named cam and with said vertically movable frame for regulably controlling the low position of said glass gathering and parison forming unit when the latter is at said parison transfer station.

6. In a glass forming apparatus, a carrier mounted to rotate about a vertical axis, a stationary cam extending part of the distance around said vertical axis, a second stationary cam extending the remainder of the distance around said vertical axis, a vertically movable frame connected with said carrier for travel with the latter about said vertical axis, pivoted levers on said carrier adjacent to said cams, rolls carried by said levers respectively arranged to travel on said cams during successive parts of the cycle of rotation of said carrier, and independently adjustable motion transmitting means between the respective levers and said vertically movable frame, and glass gathering and parison forming mechanism supported by said vertically movable frame.

7. In a glass forming apparatus, a carrier mounted to rotate about a vertical axis, a stationary cam extending part of the distance around said vertical axis, a second stationary cam extending the remainder of the distance around said vertical axis, a vertically movable frame connected with said carrier for travel with the latter about said vertical axis, pivoted levers on said carrier adjacent to said cams, rolls carried by said levers respectively arranged to travel on said cams during successive parts of the cycle of rotation of said carrier, independently adjustable motion transmitting means between the respective levers and said vertically movable frame, glass gathering and parison forming mechanism supported by said vertically movable frame, and means tending to hold each of said cam roll carrying levers away from its associate cam when the cam roll on the other lever is in contact with its associate cam.

8. In a glass forming apparatus, a rotary carrier, a radially movable carriage supported on said carrier for travel with the latter about its vertical axis, a parison mold carried by said carriage and comprising separable neck and body portions, each comprising separable sections, means for independently opening the sections of the body and neck portions of the parison body and neck mold, a vertical carrier mounted to rotate about a vertical axis, a second rotary carrier adjacent to the first rotary carrier, a finishing mold mounted on said second carrier and comprising a pair of separable sections, means for opening and closing said finishing mold sections, and cooperative periodically contacting guide elements respectively carried by said rotary carriers for controlling the radial position of said parison mold with respect to the axis of rotation of its carrier to cause said parison mold to travel in coincidence with the finishing mold for a substantial period in the cycle of rotation of the finishing mold carrier to permit the transfer of a parison from the parison mold to the finishing mold.

9. In glass forming apparatus, two adjacent carriers mounted to rotate about different vertical axes, a radially movable glass gathering and parison forming unit supported on one of said carriers for movement with the latter about its axis of rotation, a finishing mold mounted on the second carrier and comprising a pair of separable sections, a cam carried by said finishing mold carrier, a cam follower movable radially with the glass gathering and parison forming unit on the parison carrier, and yieldable means for maintaining said cam follower in contact with the cam on the finishing mold table during a substantial part of the cycle of rotation of the latter to permit transfer of the parison from the glass gathering and parison forming unit to the finishing mold.

10. In glass forming apparatus, a parison supporting member and a finishing mold respectively movable in different closed substantially horizontal paths having portions adjacent to each other, means for supporting the parison supporting member for substantially radial movement toward and from the path of movement of the finishing mold, a guide member traveling with the finishing mold, a cooperating guide member movable with said parison supporting member, and pneumatic means for yieldingly maintaining same last named guide member in contact with the first named guide member to secure and maintain coincidence of the parison supporting member and the finishing mold during the travel of the parison supporting member and the finishing mold along adjacent portions of their paths of movement to permit transfer of the parison from the parison supporting member to the finishing mold.

11. In glass forming apparatus, a parison mold table and a finishing mold table respectively rotatable about different vertical axes, a parison supporting member carried by said parison table for travel with the latter about its vertical axis and for independent movement radially of its table, a finishing mold mounted on the finishing mold table for adjustment thereon in a plurality of different horizontal directions and arranged to travel with its supporting table about the axis of rotation of the latter, a guide located above said finishing mold and having a working surface substantially concentric with the path of movement of the finishing mold, a guide follower connected to move radially with the parison supporting member, and pneumatic means urging said guide follower and said parison supporting member radially outward during part of the cycle of rotation of said parison table to cause said guide follower to follow the working surface of said guide and said parison supporting member to move in coincidence with the finishing mold for a substantial part of the cycle of rotation of the finishing mold table.

12. In glass forming apparatus, two adjacent carriers mounted to rotate about different vertical axes, a plurality of spaced glass gathering and parison forming units mounted on one of said carriers, cooperating finishing mold units mounted on the other of said carriers, said glass gathering and parison forming units and the corresponding finishing molds being adapted to be brought successively by the rotation of their respective carriers to a position to permit transfer of parisons from the parison forming units to the finishing molds, a worm gear connected with said parison mold carrier, a worm in mesh with said worm gear, a shaft to which said worm is splined, means for operatively connecting said shaft to said finishing mold carrier to effect synchronized rotary movements of said carriers, and means for adjusting said worm longitudinally on said shaft while the worm is in mesh with said worm gear to independently adjust the phase of the parison carrier.

13. In glass forming apparatus, two adjacent mold carriers, means including a drive shaft for continuously rotating said carriers in co-ordinate relation, driving connections between said shaft and carriers, parison forming units on one of said carriers, finishing molds on the other carrier, and means on said drive shaft operable during the continued rotation of said carriers for altering the co-ordinated relation between the two carriers.

14. In glass forming apparatus, a rotary mold carrying carrier, means including a drive shaft having a gear thereon in mesh with a gear on said carrier for rotating said carrier, means operable during the continued rotation of said carrier for adjusting the gear on said drive shaft to adjust said carrier angularly about its axis of rotation, a second mold carrier, and a driving connection between said shaft and the second carrier.

15. In glass forming apparatus, two adjacent carriers adapted to rotate in synchronized relation, parison forming units mounted on one of said carriers for movement therewith, finishing molds mounted on the second carrier for movement with the latter, whereby the cycles of movement of the parison forming units and the finishing molds about the axes of rotation of their respective carriers are co-ordinated, means including a drive shaft for continuously rotating said carriers, driving connections between said shaft and said carriers and means interposed between said drive shaft and one of said carriers and operable during the rotation of said carriers for adjusting the co-ordinated relation between the cycles of movement of said parison forming units and said finishing molds, respectively.

16. In a glass forming apparatus, a carrier mounted to rotate about a vertical axis, a glass gathering and parison forming unit connected with said carrier for movement with the carrier about said vertical axis and for independent vertical movement, a second carrier mounted for rotation about an axis eccentric to that of the first-named carrier and having a finishing mold thereon, the rotation of said first-named carrier causing said parison forming unit to be moved past glass gathering and transfer stations, and the rotation of said second-named carrier causing the finishing mold to be moved past said transfer station, means for moving said parison forming unit vertically with respect to its carrier, and means for regulating the height of said parison forming unit at the transfer station independently of the height thereof at the gathering station.

17. In a glass forming apparatus, a rotary carrier, a parison forming unit including a neck mold and a body mold mounted in said carrier for travel with the carrier about a vertical axis, a second carrier mounted for rotation about an axis eccentric to that of the first carrier, a finishing mold on said second carrier, means for rotating said carriers, means for supplying glass to the parison forming unit and for forming a parison therein, means for opening the body mold to leave the parison supported by the neck mold as the rotation of the carriers causes the parison forming unit and finishing mold to move toward each other into a transfer zone, a guiding member associated with the second-named carrier, a guided member associated with the neck mold on the first-named carrier, and means for engaging said members to cause the neck mold and parison supported thereby to travel in coincidence with the finishing mold in the transfer zone to transfer the parison to the finishing mold.

18. In glass forming apparatus, two adjacent carriers mounted to rotate about different vertical axes, a parison mold supported on one of said carriers for movement with the latter about its axis of rotation, a ware holder associated with said parison mold, a finishing mold mounted on the second carrier and comprising a pair of separable sections, a cam associated with said finishing mold carrier, a cam follower connected to said ware holder, and means for maintaining said cam follower in contact with the cam associated with the finishing mold carrier during a substantial part of the cycle of rotation of the latter to move the ware holder and a previously formed parison supported thereby in vertical alignment with the finishing mold.

19. In a machine for forming glass articles, the combination of mold carriages arranged side by side for rotation about vertical axes, molds on the carriages, means for rotating said carriages simultaneously and in synchronism, automatic means dependent on predetermined rotative positions of the mold carriage for transferring a parison from one mold carriage to the other, and adjusting means by which the rotative position of one carriage relative to the other may be adjusted.

20. In a machine for forming glass articles, the combination of mold carriages arranged side by side for rotation about vertical axes, molds on the carriages, means for rotating said carriages simultaneously and in synchronism, automatic means dependent on predetermined rotative positions of the mold carriages for transferring a parison from one mold carriage to the other, and adjusting means operative during the rotation of the carriages to advance the rotative position of one carriage relative to that of the other.

21. A machine for forming glass articles comprising mold carriages, molds thereon, automatic means dependent on predetermined rotative positions of the mold carriages for transferring a parison from one mold carriage to the other, a driving element, mechanism for transmitting motion from the driving element to the carriages and rotating them in synchronism, said mechanism including adjusting means by which the rotative position of one carriage may be adjusted relative to that of the other carriage.

Signed at Hartford, Connecticut, this 20th day of March, 1929.

ROBERT W. CANFIELD.